(12) United States Patent
Sawaguchi

(10) Patent No.: US 6,931,538 B1
(45) Date of Patent: Aug. 16, 2005

(54) PORTABLE PERSONAL AUTHENTICATION APPARATUS AND ELECTRONIC SYSTEM TO WHICH ACCESS IS PERMITTED BY THE SAME

(75) Inventor: Takashi Sawaguchi, 3-40-13 Takadanobaba, Shinjyuku-ku, Tokyo (JP)

(73) Assignees: Takashi Sawaguchi, Tokyo (JP); Tatuji Mizobe, Ichikawa (JP)

(*) Notice: Subject to any disclaimer, the term of this patent is extended or adjusted under 35 U.S.C. 154(b) by 920 days.

(21) Appl. No.: 09/668,741

(22) Filed: Sep. 25, 2000

(30) Foreign Application Priority Data

Sep. 24, 1999 (JP) ................................ 11-271022

(51) Int. Cl.$^7$ ........................... H04L 9/32; H04Q 7/20; B60R 25/10
(52) U.S. Cl. ...................... 713/186; 713/185; 713/202; 705/41; 705/65; 455/426.1; 340/426.18
(58) Field of Search .............................. 705/41, 44, 65, 705/77, 64, 66, 67; 713/186, 172, 182, 185, 713/201, 202; 455/406, 422.1, 426.1, 426.2; 235/380; 340/426.18

(56) References Cited

U.S. PATENT DOCUMENTS

| | | | | |
|---|---|---|---|---|
| 5,223,844 A | * | 6/1993 | Mansell et al. | 342/357.07 |
| 5,770,849 A | * | 6/1998 | Novis et al. | 235/492 |
| 5,799,087 A | * | 8/1998 | Rosen | 705/69 |
| 5,926,546 A | * | 7/1999 | Maeda et al. | 705/65 |
| 6,038,666 A | * | 3/2000 | Hsu et al. | 713/186 |
| 6,101,378 A | * | 8/2000 | Barabash et al. | 455/406 |
| 6,219,439 B1 | * | 4/2001 | Burger | 382/115 |
| 6,225,890 B1 | * | 5/2001 | Murphy | 340/426.19 |
| 6,715,679 B1 | * | 4/2004 | Infosino | 235/449 |

FOREIGN PATENT DOCUMENTS

JP 11-185016 A 7/1999 ............ G06T 1/00

* cited by examiner

Primary Examiner—Justin T. Darrow
(74) Attorney, Agent, or Firm—Smith, Gambrell & Russell, LLP

(57) ABSTRACT

An object of the present invention is to provide a portable personal authentication apparatus which can perform personal authentication, being essential in a future society, anywhere and be used for all purposes and an electronic system to which access is permitted by the apparatus. A mobile device, such as a cellular telephone or a PDA, is used with a portable personal authentication apparatus as a portable communication terminal device 51 and at least one of biological features including a man's fingerprint, voiceprint, and irisprint is used as a medium for authenticating a person as, for example, the user himself/herself. That is to say, biometric authentication is performed. In addition, functions like an electronic purse a conventional IC card etc. had are included in the portable communication terminal device (portable personal authentication apparatus) and the portable communication terminal device is connected to ATM equipment etc. This enables the portable communication terminal device to be managed unitarily as an electronic purse. Furthermore, a portable communication terminal device (portable personal authentication apparatus) is used for authenticating a person as, for example, the driver himself/herself in the case of canceling urgent notification in a notifying system. This will increase the reliability of notification.

4 Claims, 4 Drawing Sheets

PORTABLE PERSONAL AUTHENTICATION APPARATUS AND ELECTRONIC SYSTEM TO WHICH ACCESS IS PERMITTED BY THE SAME

BACKGROUND OF THE INVENTION

1. Field of the Invention

The present invention relates to a portable personal authentication apparatus used in, for example, an electronic system which performs only personal authentication or which is based on personal authentication and an electronic system, to which access is permitted by the apparatus and, more particularly, to a portable personal authentication apparatus and an electronic system, to which access is permitted by the apparatus, which preferably are used for security management electronic commerce, or urgent notification in the case of a car accident or a disaster in the sea or mountains having occurred.

2. Description of the Related Art

Conventionally, an electronic settling system in which predetermined electronic data, together with personal information, is stored on an IC card, credit card, debit card, super card, etc. and payment is performed by exchanging the electronic data has been known as a substitute for cash.

Meanwhile, electronic commerce with a communication network, such as Internet, is being realized in recent years. Various techniques for performing settlement regarding electronic commerce on a network have been suggested accordingly Settlement with a credit card or cash settlement with E-cash having the same value as real paper money has is a typical one.

Under such conditions the possibility of everybody accessing a computer connected to Internet occurs and the importance of electronic authentication for judging whether a user is authorized or information is proper is increasing. In addition, companies have begun to use Internet for important business, such as commercial transactions, so electronic identification has become essential in a network society.

Furthermore, a notifying system for urgently notifying the competent center, such as a fire department, the police, or an insurance company, of information about the accident in the case of an air bag in a car operating is being realized recently. However, even if an air bag operates, the accident can be slight or this may be caused by a device malfunction. With a slight accident, the person concerned can release the urgent notifying system. With a major accident, however, somebody can release the urgent notifying system by intention or mistake. In this case it is important, for example, to authenticate a man who notified as the person concerned.

In the above electronic commerce, if electronic settlement is performed using a storage medium, such as an IC card, or if settlement is performed using a credit card, user authentication by password input is necessary each time a system is used. The reason for this is to prevent its unfair use by a third party, but this has the disadvantage of complex operation and processing. Furthermore, without such a protective method, it has the disadvantage of the entire amount of money set on an IC card etc. being exposed to the risk of unfair use by a third party.

If electronic commerce is performed with Internet, the latter settlement system needs a credit card and information, such as a card number, which needs security must be sent in some way. This has the same disadvantage as the electronic settlement with an IC card has.

In the above notifying system of a car accident etc., a highly reliable method for authenticating the person concerned is also required in the case of releasing the urgent notifying system and notification or the cancel of notification is expected to take place with high reliability.

A method for easily performing personal authentication anywhere which is also applicable to cases other than the above, will be necessary in the future. In a card society there is a flood of cards. People must carry many cards and manage cards, which is troublesome to them.

An object of the present invention therefore is to provide a portable personal authentication apparatus which can solve the above problems, perform personal authentication, being essential in a future society anywhere, and be used for all purposes and an electronic system to which access is permitted by the apparatus.

SUMMARY OF THE INVENTION

The portable personal authentication apparatus according to claim 1 of the present invention which solved the above problems is configured portably, includes built-in communication means and reading means for reading at least one of a man's biological features, and performs personal authentication on the basis of authentication data being data the reading means read.

Preferably, the portable personal authentication apparatus is configured with a portable apparatus, such as a cellular telephone or PDA, which will be possessed at the rate of approximately one per person in the future as a base or the portable personal authentication apparatus is also given a function as a cellular telephone or PDA. When he portable personal authentication apparatus performs personal authentication, it will compare input authentication data (data it read) and reference data registered in advance. In this case, the reference data registered in advance may be stored in the portable personal authentication apparatus. Alternatively, the reference data registered in advance may be stored in, for example, a server ("authentication server" in an embodiment of the present invention) other than the portable personal authentication apparatus. In this case, for example, the portable personal authentication apparatus sends the input authentication data to the server side via the communication means and obtains the results of authentication performed on the server side via the communication means. This portable personal authentication apparatus can be used for, for example, the questioning of a suspicious character by the police or guard by, for example, a security company. In addition, the portable personal authentication apparatus can be used more widely, that is to say, for personal authentication.

The communication means may be wired or wireless.

In the portable personal authentication apparatus according to claim 2, the authentication is biometric authentication using at least one of a man' fingerprint, voiceprint, retinaprint, irisprint, face, and signature and the reading means can read at least one of a man' fingerprint voiceprint, retinaprint, irisprint, face, and signature for the biometric authentication.

These are unique to each person and, unlike a password, each person need not keep them in mind. Furthermore, unlike an article, such as a key, there is no fear of misplacing them. The reading means can be a microphone for voiceprint, a CCD camera for fingerprint, retinaprint, irisprint, face, and signature, and a scanner for fingerprint and signature.

The portable personal authentication apparatus according to claim 3 is used for personal authentication in an electronic system which can be accessed by a user on the basis of personal authentication and a user who intends to use the electronic system is permitted to access the electronic system on the basis of the authentication data read.

As stated above, when the portable personal authentication apparatus performs personal authentication, it will compare input authentication data (data it read) and reference data registered in advance. The reference data registered in advance may be stored in the portable personal authentication apparatus. In this case, the results of authentication are sent to the electronic system. Alternatively, the results of authentication are displayed on the portable personal authentication apparatus. Furthermore, the reference data registered in advance may be stored in, for example, a server included in the electronic system. In this case, for example, the input authentication data is sent to the electronic system side.

The term "access" in the claims includes the action of performing communication in order to cancel an SOS signal and canceling the SOS signal, as in an embodiment of the present invention. The term "electronic system" in the claims includes an electronic commerce system, an automatic charge receiving apparatus installed, for example, in the road or at a parking lot, an automatic vending machine, a public telephone line (including ISDN), a personal computer, LAN (wired or wireless), and Internet. With an automatic vending machine, for example, the following configuration can be adopted. A portable personal authentication apparatus and an automatic vending machine are connected by a wire (or by radio), authentication data is input (read) on the portable personal authentication apparatus side, and the input authentication data is sent to the automatic vending machine. This enables transactions. With LAN, the following configuration can be adopted. A portable personal authentication apparatus is connected to a personal computer on the terminal side by a wire (or by radio), authentication data is input on the portable personal authentication apparatus side, the input authentication data is sent to the personal computer side, and the personal computer or a server judges. This enables the use of the personal computer and/or access to the server.

In the portable personal authentication apparatus according to claim 4, the electronic system is an electronic commerce system in which E-cash is created by giving monetary value to electronic information flowing on a communication network and the settlement of business transactions is performed with this E-cash, and the portable personal authentication apparatus inputs authentication data for personal authentication required by the electronic commerce system, withdraws a predetermined amount of savings from a predetermined account at a financial institution, stores them in a storage section as E-cash, performs the settlement of the business transactions with the stored E-cash, and leaves the balance of the E-cash after the settlement and its use history in The storage section.

An electronic commerce system including this portable personal authentication apparatus as a portable communication terminal device is an electronic system in which E-cash is created by giving monetary value to electronic information flowing on a communication network and the settlement of business transactions is performed with this E-cash, and is based on personal authentication.

Both the IC-card type and network type are included in this E-cash; there are no limitations. In addition, both the closed type and open type are included in this E-cash; there are no limitations. After open-type E-cash was used, it can be transferred to another person without being settled and encashed immediately.

In the portable personal authentication apparatus according to claim 5, the electronic system is an electronic commerce system in which settlement is performed with credit information, and the portable personal authentication apparatus inputs authentication data for personal authentication required by the electronic commerce system and includes storing means for storing credit information.

An electronic commerce system including this portable personal authentication apparatus as a portable communication terminal device is an electronic system in which the settlement of business transactions is performed in credit form, and is based on personal authentication.

In the portable personal authentication apparatus according to claim 6, the electronic commerce system is an automatic charge receiving system for automatically collecting a toll.

An electric toll collection (ETC) is known as an automatic charge receiving system for automatically collecting a toll. The portable personal authentication apparatus enables a device of ETC mounted in a car to operate (performs authentication for automatic charge receiving).

Alternatively, a configuration in which a device of ETC installed on the road and the portable personal authentication apparatus communicate directly can be adopted. In this case, the device of ETC mounted in a car is unnecessary.

In the portable personal authentication apparatus according to claim 7, the electronic system is a notifying system for giving urgent notification to the competent center in the case of an emergency having occurred, the portable personal authentication apparatus is used at least for notification of cancel given in the case of canceling the urgent notification, and authentication data read by the portable personal authentication apparatus is sent to the competent center by the communication means in the case of giving the notification of cancel.

In a notifying system as an electronic system which includes this portable personal authentication apparatus as a portable communication terminal device, equipment for receiving satellite waves of the Global Positioning System is mounted in, for example, a vehicle and urgent notification is given to the competent center in the case of an emergency having occurred. In this notifying system, the mounted equipment will give urgent notification in the case of an emergency having occurred by sending at least data regarding the present position derived from the satellite waves via a portable communication line network. To cancel urgent notification in this notifying system, the portable personal authentication apparatus is used to contact the competent center. In this case, authentication data read by the portable personal authentication apparatus is sent to the competent center by the communication means and is compared with reference data having been registered with, for example, a server at the competent center in advance. On the basis of the comparison result, the cancel of the urgent notification will be judged To be valid.

Furthermore, in cases of an accident and disaster on sea or on shore, the portable personal authentication apparatus can be used to send authentication data and to give urgent notification. As with the cancel of urgent notification, this will be effective for identifying a person and preventing a trick etc.

In the portable personal authentication apparatus according to claim 8, one of the biological features is a fingerprint, the portable personal authentication apparatus includes a PC-card slot, and user authentication is performed by inserting a PC card equipped with reading means for reading the fingerprint into the PC-card slot.

The invention according to claim 9 is an electronic system to which access is permitted by the portable personal authentication apparatus.

As stated above, the present invention can be used to perform personal authentication widely. In addition, a portable communication terminal device is used as a medium for performing user authentication in electronic commerce in which E-cash is crated by giving monetary value to electronic information flowing on a communication network and the settlement of business transactions is performed with this E-cash, and as a medium for contract and settlement This portable communication terminal device withdraws an arbitrary amount of savings from an account at a predetermined financial institution via built-in communication means, includes storing means for storing them as E-cash, performs the settlement of the business transactions with the stored E-cash, and records the balance of the E-cash after the settlement and its use history.

In this way, operational trouble can be saved by giving a portable communication terminal device (a portable personal authentication apparatus has its function) a function like an electronic purse which a conventional IC card etc. bad and a security function can be enriched by using at least one of fingerprint, voiceprint, irisprint, retinaprint, face, and signature, being biological features, as a biometric medium for user authentication.

Moreover, a portable personal authentication apparatus can be managed unitarily as an electronic purse by connecting it to, for example, ATM equipment. In addition, the mobile device is used to incorporate service systems built by distribution-related companies including banks, securities companies, insurance companies, credit sale companies, department stores, supermarkets, transportation companies, etc. with, for example, Internet or ATM online and communicate with them. By doing so, instructions about a contract concerning receiving or giving an order, settlement, the cancel of a contract, etc. can be given easily.

A portable communication terminal device according to the present invention can also be used as a medium for authenticating the person concerned at the time of canceling the urgent notification given to the competent center in the case of a traffic accident, a disaster, or the like having occurred. In this case, an SOS signal indicating the present position etc. via equipment being able to receive satellite waves of the Global Positioning System (GPS) is sent to the competent center via a portable communication line. By authenticating the person concerned in the case of canceling urgent notification, the cancel of urgent notification caused by a device malfunction or performed with evil intent can be prevented, resulting in an increase in the reliability of notification.

DETAILED DESCRIPTION OF THE PREFERRED EMBODIMENT

An embodiment of the present invention will now be described in detail with reference to the drawings.

Figure 1:
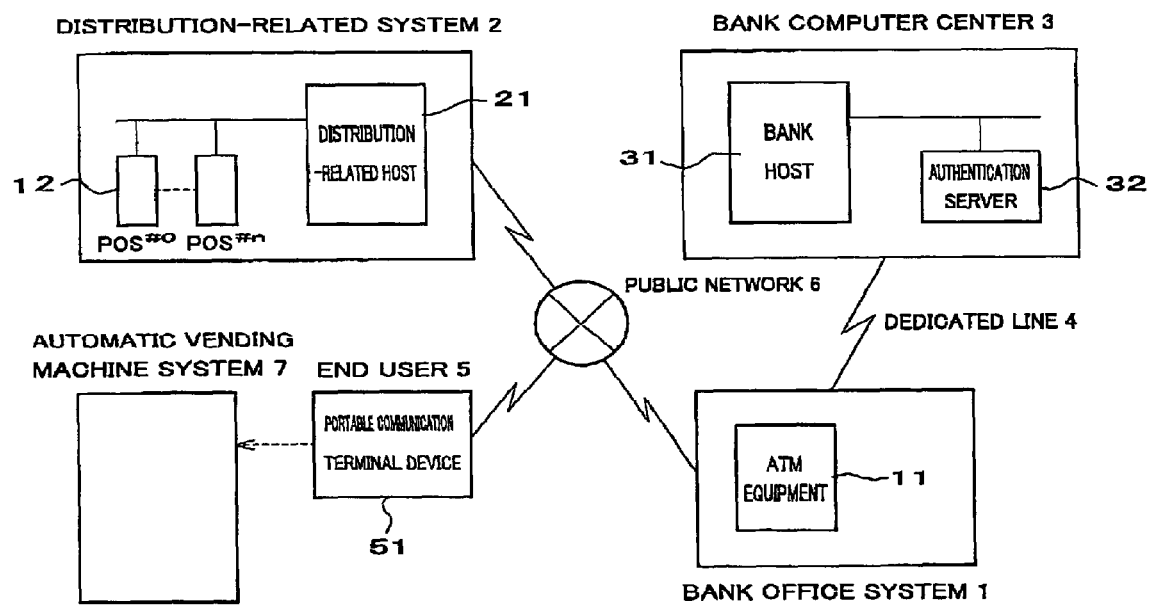
FIG. 1 is a block diagram showing an embodiment of the present invention.

FIG. 1 is a block diagram showing an embodiment of electronic commerce in which a portable personal authentication apparatus according to the present invention is used as a portable communication terminal device. In FIG. 1, 1 is a bank office system and ATM equipment 11 is installed at the window. 2 is a distribution-related system of a securities company, insurance company, credit sale company, department store, supermarket, transportation company, or the like and can be a system of a bank. In the distribution-related system 2 with a distribution-related host 21 as a nucleus, a POS terminal 22 is located dispersedly at a remote place.

3 is a bank computer center with a bank host 31 as a nucleus and is connected to each bank office system 1 via a dedicated line 4. Furthermore, an end user's fingerprint is taken in advance for authenticating the user himself/herself and its information is stored in an authentication server 32. Each time user authentication is performed with the authentication server 32, which contributes to security.

In an embodiment described below, fingerprint that has given actual results in criminal investigation etc. will be used as a method for user authentication. However, there are other methods which can identify a person with certainty: voiceprint, irisprint, and retinaprint. Any of them may be used. The definitions of fingerprint, voiceprint, and irisprint will now be given for information. Fingerprints are patterns formed by rising lines of skin on the palm side of a person's fingertips and are roughly divided into arches, hoof-like patterns, and curlicued patterns in shape. The frequency of the occurrence of each type depends on finger type, right or left, sex, race, etc. Fingerprint is formed after a viviparity period of three or four months. Each fingerprint has a unique shape and is constant for a lifetime. It therefore is used to identify a person.

Voiceprint is the results of frequency analysis of a human voice indicated with a sonograph. Irisprint is the pattern of an iris which is a circle-shaped membrane in front of the lens of an eyeball surrounding the pupil. A choroid coat extends to form an iris. On an iris, the dilator pupillae muscle exists radially and the sphincter muscle of pupil exists in the shape of a circle. An iris responds to light and works reflectively. It dilates or shrinks the pupil and adjusts light and darkness. The color of eyes, such as brown or blue, depends on pigment included in the irises.

A photo of a face or writing, such as a signature, may be used for authentication instead of a man's biological features described above.

Now the description will revert to FIG. 1. 5 is an end user. A portable communication terminal device 51, being a mobile device such as a cellular telephone or personal data assistant (PDA), carried by the end user 5 is connected to the ATM equipment 11 included in the bank office system 1 and the host 21 included in the distribution-related system 2 via a public network 6. An automatic vending machine system 7 which is not connected to the public network 6 is connected offline with the portable communication terminal device 51, as described later.

The above bank office system 1 and distribution-related system 2 must join an E-cash issuance and operation organization for issuing and operating E-cash in advance. Furthermore, a person as the end user 5 must use the portable communication terminal device 51 to deduct the necessary amount from his/her own savings account and change it for E-cash and store information about its monetary value in a built-in storage in advance, as described later.

E-cash must be linked with the key currencies, such as the yen or dollar. Electronic commerce includes not only commodity transactions but also service transactions. Commodities include finance-related ones which banks or securities companies deal in.

Figure 2:
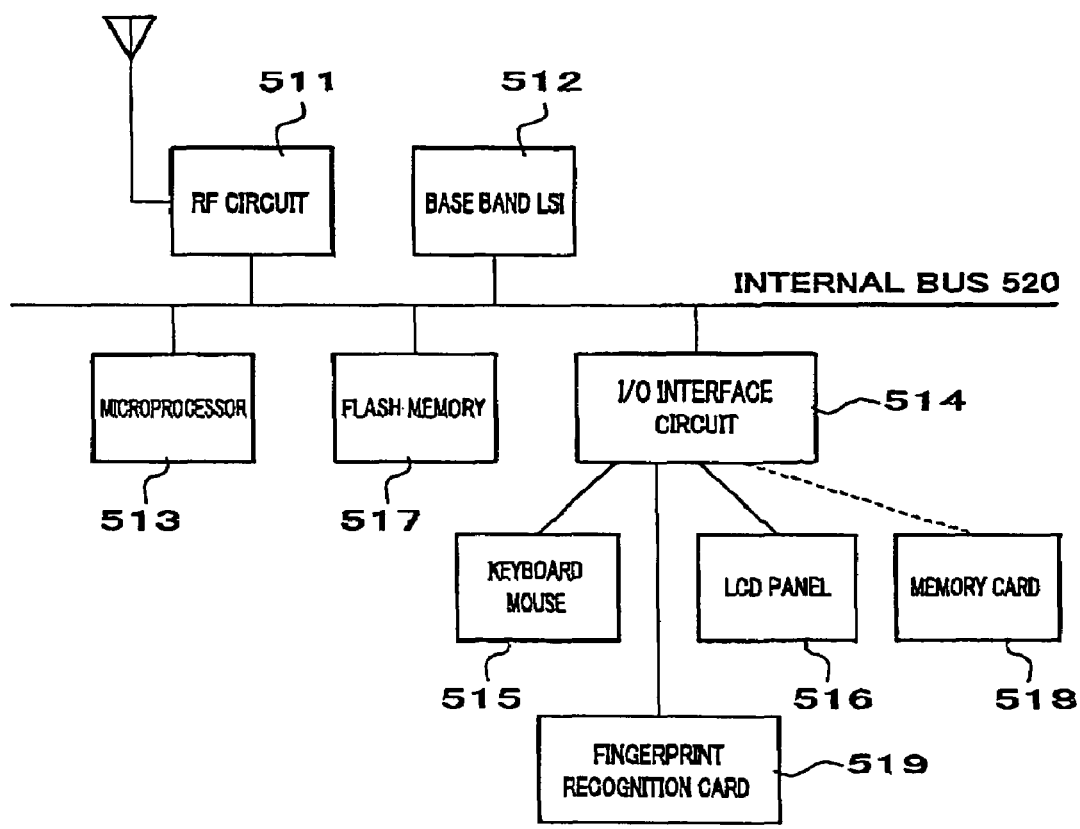
FIG. 2 is a block diagram showing the internal configuration of the portable personal authentication apparatus (portable communication terminal device) in FIG. 1.

FIG. 2 is a block diagram showing the internal configuration of the portable communication terminal device 51 in FIG. 1. In this case, a cellular telephone terminal is shown as an example. As shown in FIG. 2, the cellular telephone terminal basically comprises an RF circuit 511, a base band LSI 512 with a digital signal processor (DSP) as a nucleus, a microprocessor 513, an I/O interface circuit 514, an LCD panel 515, a keyboard mouse 516, a flash memory 517, a memory card 518, and a fingerprint recognition card 519.

The base band LSI 512, microprocessor 513, I/O interface circuit 514, flash memory 517 are connected with one another via an internal bus 520. In addition, the LCD panel 515, keyboard mouse 516, memory card 518, and fingerprint recognition card 519 are connected to the I/O interface circuit 514. The memory card 518 and fingerprint recognition card 519 are mounted in card slots of the cellular telephone terminal proper. They can be attached or removed freely. In this case it is assumed that the card slots comply with the PC card standard.

In this embodiment of the present invention, "Finger Pass Card" manufactured by Fujitsudenso Co., Ltd. will be used as the fingerprint recognition card 519. The fingerprint recognition card 519 has an interface which conforms to PCMCIA Type II, being the standard of a PC card slot. By combining the fingerprint recognition card 519 with a scanner, data regarding fingerprints of one thousand to ten thousand users can be registered easily and a reliable comparison can be made to a comparison level. If at the time of registration, a user presses his/her finger on a scanner section located at the end of the card (opposite the PC card slot connection) and registers a clear fingerprint, then good results can be obtained at the time of comparison. In this case, feature extraction is performed using the feature correlative method in which accuracy in identifying a person as the user himself/herself or another person is increased by using a relative connection between characteristic points included in a fingerprint pattern.

Fingerprint recognition can be performed only with the portable communication terminal device 51 proper, that is to say., without the fingerprint recognition card 519. In this case, at least part of the LCD panel 515 is combined with a tablet and fingerprint data is taken by pressing a finger on this area, as described later A built-in recognition driver (software) of the portable communication terminal device 51 proper recognizes (extracts features from) the data and send it to the external authentication server 32, which prompts comparing operations.

Programs and personal information described later are stored in the flash memory 517. If circumstances require, a fingerprint pattern which has been taken and registered is also stored in the flash memory 517. Data processed by the programs is stored in the memory card 518.

Figure 3:
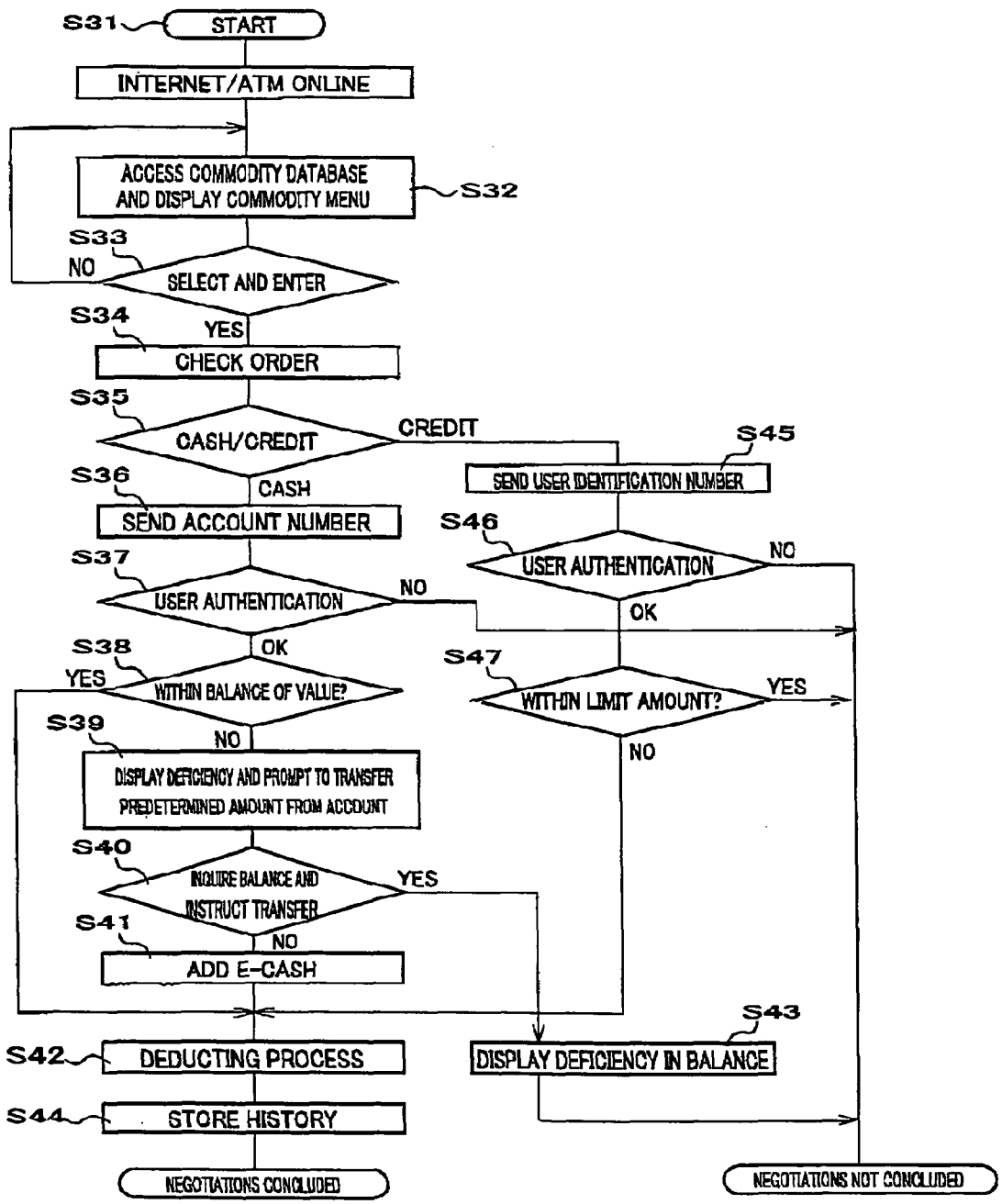
FIG. 3 is a flow chart roughly showing operations in the embodiment of the present invention shown in FIG. 1.

FIG. 3 is a flow chart for describing operations in this embodiment of the present invention. Specifically, FIG. 3 shows the processing procedure of software programmed and recorded in a flash memory in the portable communication terminal device 51 and the distribution-related system 2. Only a part related to the present invention is shown.

The operations in the embodiment of the present invention shown in FIGS. 1 and 2 will now be described in detail with reference to the flow chart shown in FIG. 3.

First, a person as the end user 5 uses his/her own portable communication terminal device 51 (i.e. portable personal authentication apparatus) to utilize an ATM online system or to utilize Internet and access a service system provided by each of companies including banks (step S31). In either case, the public network 6 is used to access.

For example, it is assumed that a request to display a menu of commodities sold by a distribution-related department store is made. The portable communication terminal device 51 searches the desired menu of commodities and receives it from the distribution-related system 2 (step S32). Then the portable communication terminal device 51 selects a commodity which the end user 5 wants to buy and specifies the name of the commodity and a settlement method via the keyboard mouse 516 (step S33).

By doing so, the built-in microprocessor 513 of the portable communication terminal device 51 accesses a personal information area in the flash memory 517 created in advance and sends an identification number (or account number) of the person (in the case of cash settlement) or credit information (user identification number) about the person (in the case of credit settlement) to a distribution-related company which provides a service via Internet (steps S36 and S45).

In the case of cash settlement, the amount paid and information about the balance of value set and stored in the memory card 518 are compared (step S38). If the amount paid is within the balance, then the amount is withdrawn (step S42) and the negotiations are concluded. If the amount paid is not within the balance, then the user is prompted to deduct, an inquiry about his/her bank balance is made via the ATM equipment 11, authentication for his/her bank savings account is performed (step S40), and a predetermined amount is added to the memory card 518 (step S41). Then the amount corresponding to a deficiency is deducted (step S42). Furthermore, the initial information about value, balance, the actual results of payment, etc. is updated and left in the memory card 518 as a history.

In order to save the user the trouble of entering his/her password, the above authentication for his/her bank savings account is sent automatically to the user's bank by the portable communication terminal device 51 accessing the personal information area written into a fixed area in the flash memory 517. Alternatively, the user is prompted to press his/her finger on a sensor area of the fingerprint recognition card 519 included in the portable communication terminal device 51. Then the fingerprint information obtained by or via the fingerprint recognition card 519 is received and a comparison process is performed. The comparison process is performed with the authentication server 32 at the bank computer center 3. Comparison operations with fingerprint information taken in advance at the time of the user opening the account are performed and the authentication is performed automatically.

If the use's fingerprint is already taken and stored in a specific area in the flash memory 517, a method for automatically sending the registered information may be adopted in order to save the above trouble.

This is the same with credit settlement. Personal information such as a card identification number, is written into a fixed area in the flash memory 517. The result of authentication is obtained by sending the contents of this area to a company that issued the user's credit card. Alternatively, the user is prompted to press his/her finger on the sensor area of the fingerprint recognition card 519 included in the portable communication terminal device 51. Then the fingerprint information obtained is received and a comparison process is performed. The comparison process is entrusted to the authentication server 32 at the bank computer center 3 or is performed with a database prepared independently.

In this stage, comparison operations with fingerprint information taken in advance are performed and authentication is performed automatically. The company that issued the user's credit card checks whether the card identification number or fingerprint is correct and the price of a commodity (in the case of buying a commodity desired) is within the limit amount of a transaction (steps S46 and S47). Then the procedure will proceed to the process for receiving an order for the commodity.

If the amount paid exceeds the balance in the user's savings account as a result of inquiry, then it is impossible to pay the amount. This is displayed on the LCD panel 515 of the portable communication terminal device 51 (step S43) and the negotiations are not concluded. Similarly, if the amount paid exceeds the balance in the case of credit settlement, it is impossible to pay the amount. This is displayed and the negotiations are not concluded.

A distribution-related company which receives the order checks whether it keeps stock on the basis of order information received. If it keeps stock, then it informs the portable communication terminal device 51, which gave the order, via Internet that it keeps stock and that the settlement process is complete. If it does not keep stock, then it informs the portable communication terminal device 51 via Internet that it does not keep a stock of the commodity the user ordered and when the commodity will be received.

The memory card 518 of the portable communication terminal device 51 is mounted in a PC card slot of the portable communication terminal device 51 proper. The memory card 518 can be removed at need and, for example, the process of payment regarding an automatic vending machine can be performed by mounting the memory card 518 in a card slot of the automatic vending machine system 7. In addition, an exchange of E-cash can be performed locally by mounting the memory card 518 in a card slot of the ATM equipment 11.

Figure 4:
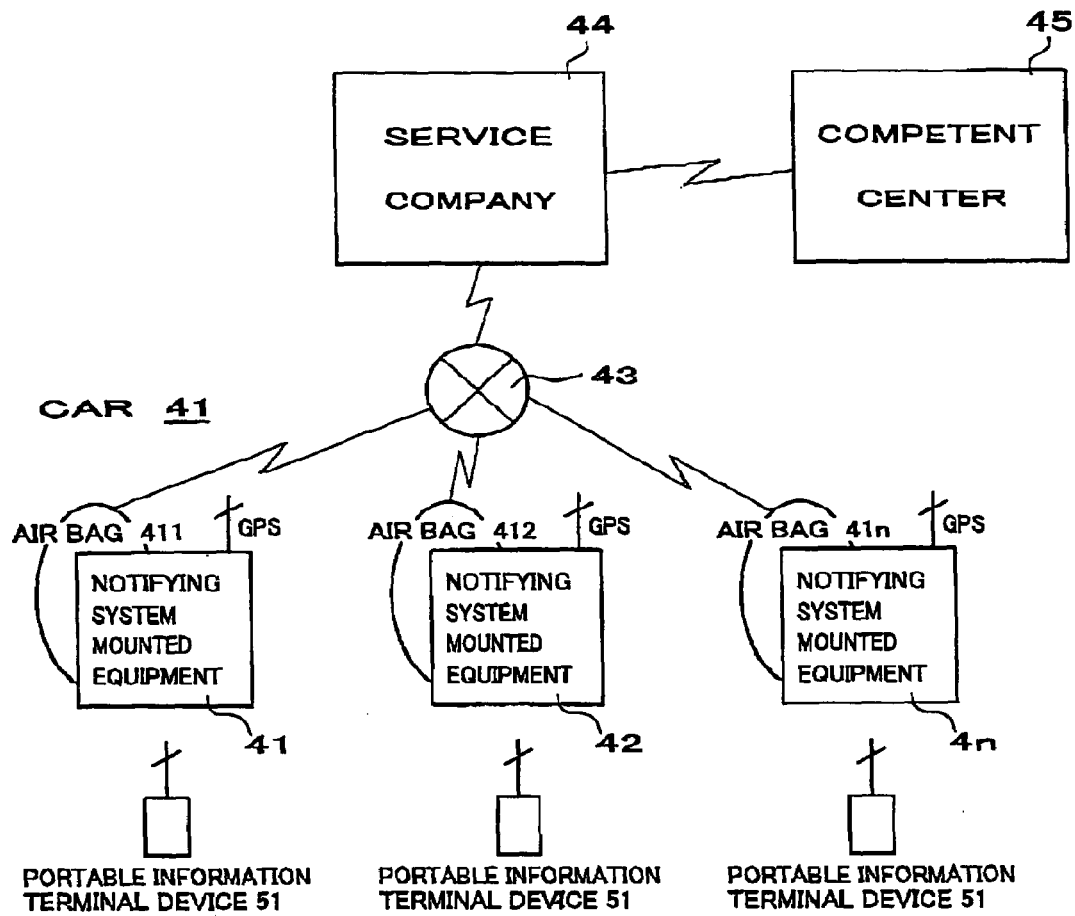
FIG. 4 is a block diagram showing another embodiment of the present invention.

FIG. 4 is a block diagram showing an embodiment of a notifying system in which a portable personal authentication apparatus according to the present invention is used as a portable communication terminal device. A system shown in FIG. 4 is one for automatically emitting an SOS signal from a car 41 (42 and 4n) in the case of a car accident having occurred in so order to urgently notify the competent center 45, such as the police, a fire department, or an insurance company, of the accident. In this case, equipment (notifying system mounting equipment 411) including a car navigation system being able to receive satellite waves of the Global Positioning System (GPS) as a component is mounted in each car 41 (–4n) and a mechanism in which an SOS signal to indicate its present position in case of emergency is emitted via a cellular telephone line 43 is adopted.

Specifically, when an air bag operates due to a traffic accident etc., the mounted equipment automatically sends information, such as the present position checked by GPS and a car body number. A twenty-four-hour-a-day service company 44 receives this information and notifies the police or a fire department (competent center 45) nearest the accident site of the position of the car, the name and address of its driver, and a number of the car. This information can also be sent manually in the case of a driver having a fit due to a sudden illness during driving. Furthermore, the strength of the mounted equipment is much the same as that of a flight recorder which can withstand the shock of an accident. If satellite waves of GPS cannot be received, the present position can be checked by map matching in which data from an optical fiber gyro included in a car navigation system, data regarding the distance covered by the car, map data, etc. are used.

In the above configuration, even if an air bag etc. operate, the accident can be slight or this may be caused by a device malfunction. In this case, if the driver himself/herself releases the notifying system, then no problem arises. With a major accident, however, somebody can release the notifying system by intention or mistake. Therefore, the above portable communication terminal device 51 (portable personal authentication apparatus) having a personal authentication function is used to authenticate a person as the driver himself/herself and checking is done via the service company 44 or competent center 45 in order to verify whether the person is qualified to release the notifying system.

The mechanism of authentication is the same as that of the electronic commerce system shown in FIG. 1, so its description will be omitted in order to avoid duplication. However, a mechanism in which a fingerprint is not taken each time but is registered in advance with the built-in flash memory 517 and its information is automatically sent at the time of notification can be necessary.

In the above embodiment, a portable personal authentication apparatus which also functions as the portable communication terminal device 51 has been described with a cellular telephone terminal as an example. However, various mobile devices, such as PDA, which have the basic configuration shown in FIG. 2 may be used instead of a cellular telephone terminal. Furthermore, a man's fingerprint was used as a medium for user authentication in the embodiments of the present invention, but a man's voiceprint, irisprint, retinaprint, face, signature, etc. which have biological features and have given actual results as a medium for user authentication may be used instead.

Only the example of mounting the fingerprint recognition card 519 on the market in the card slot of the portable communication terminal device 51 was shown as a medium for taking and comparing fingerprints. However, the portable communication terminal device proper may include its function instead. There are now many PDAs on the market which have both display and entry functions. These PDAs often include a function for image recognition in themselves Therefore, if a PDA proper includes software for fingerprint recognition, then it may be used instead.

In addition, only the memory card 518 was shown as an example of storage media of E-cash. However, any kind which can be mounted in the portable communication terminal device 51 proper so as to be freely attachable or removable and is readable and writable may be used.

In the embodiments of the present invention, only cases where a portable personal authentication apparatus is applied to an electronic commerce system and notifying system as a portable communication terminal device were described. A portable personal authentication so apparatus, however, can be used for keyless entry by remote control in a car. In addition, a portable personal authentication apparatus may be used only for personal authentication. It has different uses. For example, it can be used for authentication in the case of a suspicious character being questioned by the police etc. Furthermore, it can be used for identifying a suspicious character questioned by the police, a security company, or the like. In this case, reference data as a standard may be stored in a portable personal authentication apparatus or, as in the above embodiment, in an authentication server. A portable personal authentication apparatus is also susceptible of wide application as a notifying system. That is to say, it is useful in cases of not only car accidents but also disasters etc. in the sea or mountains.

Moreover, a portable personal authentication apparatus is applicable to any electronic system based on personal authentication, including permission for the operation of a car-mounted device in ETC and automatic vending machines such as a commuting ticket vending machine.

As described above, a portable personal authentication apparatus according to the present invention is fit for all uses. A security function can be enriched by using a fingerprint, voiceprint, irisprint, retinaprint, face, signature, or the like, being a biological feature, as a medium for user authentication.

In addition, by including functions an IC card, credit card, etc. have in a portable personal authentication apparatus according to the present invention and, for example, connecting it to ATM equipment, the portable personal authentication apparatus can be managed unitarily as a purse. Moreover, by incorporating a service system built by each company, various business transactions can be performed easily. Furthermore, compared with the use of an IC card as a medium for E-cash, it saves the trouble of password entry etc. A use history is stored each time in a storage device of a communication device and is displayed visually on a balance etc. display panel at need. Therefore, the present situation including history can be grasped, which is very convenient to a user.

A portable personal authentication apparatus according to the present invention can also be used as a medium for authenticating the person concerned at the time of canceling the urgent notification given to the competent center in the case of a traffic accident, a disaster, or the like having occurred. In this case, an SOS signal indicating the present position etc. via equipment etc being able to receive satellite waves of the Global Positioning System (GPS) is sent to the competent center by any communication medium. In the case of canceling urgent notification, communication is performed with a communication medium of a portable personal authentication apparatus and the authentication of the person concerned is performed. This will prevent the cancel of urgent notification caused by a device malfunction or performed with evil intent, resulting in an increase in the reliability of notification.

What is claimed is:

1. A portable personal authentication apparatus configured so as to be portable, the apparatus comprising:
   built-in communication means for wirelessly connecting to a public network; and
   reading means for reading at least one of a human's biological features, wherein
      personal authentication is performed on the basis of data read by the reading means as authentication data,
      the portable personal authentication apparatus is used for personal authentication in an electronic system which can be accessed by a user on the basis of personal authentication,
      a user who intends to use the electronic system is permitted to access the electronic system on the basis of the authentication data read,
      the electronic system is a notifying system for giving urgent notification to a competent center in the case of an emergency having occurred,
      the portable personal authentication apparatus is used at least for notification of cancel given in the case of canceling the urgent notification, and
      authentication data read by the portable personal authentication apparatus is sent to the competent center by the communication means in the case of giving the notification of cancel.

2. The portable personal authentication apparatus according to claim 1, further including a PC-card slot, wherein one of the biological features is a fingerprint, further wherein user authentication is performed by inserting a PC card equipped with reading means for reading the fingerprint into the PC-card slot.

3. An electronic system to which access is permitted by the portable personal authentication apparatus according to claim 1.

4. A portable personal authentication apparatus configured so as to be portable, the apparatus comprising:
   a built-in communication arrangement for wirelessly connecting to a public network;
   reading means for reading at least one of a human's biological features, personal authentication being performed on the basis of data read by the reading means as authentication data;
   information storage;
   registering means for registering in the information storage at least one of a human's biological features read by the reading means; and
   comparing means for comparing the registered authentication data with authentication data currently read by the reading means in accordance with a predetermined criteria,
   wherein the built-in communication means comprises a cellular device; and
   wherein the built-in communication means is connectable to a network of cellular devices as the public network,
   wherein the portable personal authentication apparatus is an electronic system which can be accessed by a user on the basis of personal authentication,
   wherein a user who intends to use the electronic system is permitted to access the electronic system on the basis of the authentication data,
   wherein the electronic system is accessed by the user through the built-in communication means and the public network,
   wherein the electronic system is a notifying system for providing notification to a competent center in the case of an emergency having occurred,
   wherein the portable personal authentication apparatus is used at least for notification of cancel given in the case of canceling the urgent notification, and
   wherein authentication data read by the portable personal authentication apparatus is sent to the competent center by the communication means when providing a cancel notification.

* * * * *